United States Patent [19]

Kitamoto et al.

[11] Patent Number: 4,875,610
[45] Date of Patent: Oct. 24, 1989

[54] METHOD OF AND SYSTEM FOR DRIVING MAGNETIC TAPE

[75] Inventors: Tatsuji Kitamoto, Kanagawa; Katsuya Yokoyama; Takuji Sekiguchi, both of Tokyo, all of Japan

[73] Assignees: Fuji Photo Film Co., Ltd., Kanagawa; Nippon Hoso Kyokai, Tokyo, both of Japan

[21] Appl. No.: 196,522

[22] Filed: May 20, 1988

[30] Foreign Application Priority Data

| May 22, 1987 | [JP] | Japan | 62-125581 |
| May 22, 1987 | [JP] | Japan | 62-125582 |
| May 22, 1987 | [JP] | Japan | 62-125583 |

[51] Int. Cl.[4] .................................................. B65H 20/36
[52] U.S. Cl. ....................................... 226/10; 226/120; 242/209; 242/210
[58] Field of Search ........................ 226/10, 120, 123; 242/179, 209, 210; 360/83, 90

[56] References Cited

U.S. PATENT DOCUMENTS

| 4,200,246 | 4/1980 | Schneider et al. | 226/18 X |
| 4,237,399 | 12/1980 | Sakamoto | 360/317 |
| 4,367,504 | 1/1983 | Seki et al. | 360/109 |

OTHER PUBLICATIONS

Applied Physics, pp. 65–66, No. 6, vol. 54, 1985.

Primary Examiner—Daniel P. Stodola
Assistant Examiner—Phillip Han
Attorney, Agent, or Firm—Sughrue, Mion, Zinn, Macpeak & Seas

[57] ABSTRACT

A unidirectional traveling-surface-wave by ultrasonic oscillation is generated on a surface of an oscillator, and a magnetic tape is run in the direction opposite to the traveling direction of the surface wave by pressing the surface of the oscillator against a surface of the magnetic tape.

21 Claims, 3 Drawing Sheets

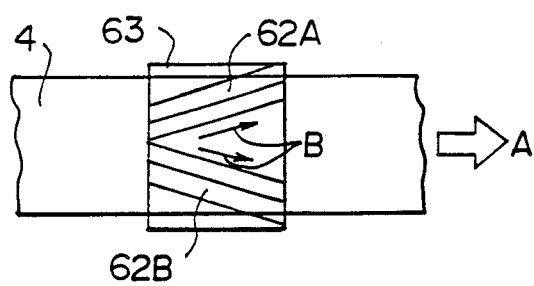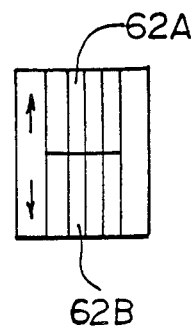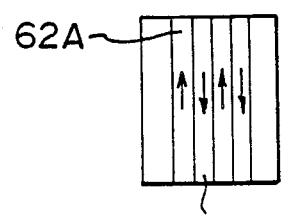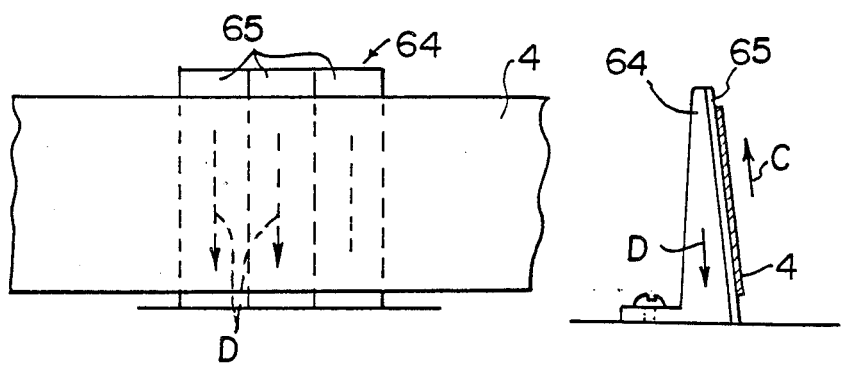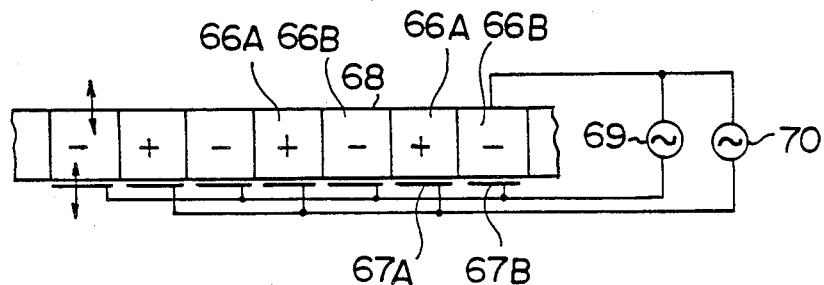

METHOD OF AND SYSTEM FOR DRIVING MAGNETIC TAPE

BACKGROUND OF THE INVENTION

1. Field of the Invention

This invention relates to a method of and a system for driving a magnetic tape which are particularly suitable for driving a thin magnetic tape.

2. Description of the Prior Art

As is well known, in a videotape recorder or an audiotape recorder, the magnetic tape is conventionally run by a capstan and a pinch roller rotated at a constant speed. However, when a thin magnetic tape such as a long-playing tape is driven by such a driving system, the magnetic tape is apt to twist or meander to adversely affect running of the tape, or is sometimes stretched by tension, thereby making it impossible to effect accurate tracking.

SUMMARY OF THE INVENTION

In view of the foregoing observations and description, the primary object of the present invention is to provide a novel method of and a novel system for driving a magnetic tape which is free from the aforesaid drawbacks inherent to the conventional driving system comprising the capstan and the pinch roller.

In accordance with the present invention, a unidirectional traveling-surface-wave by ultrasonic oscillation is generated on a surface of an oscillator, and a magnetic tape is run in the direction opposite to the traveling direction of the surface wave by pressing the surface of the oscillator against a surface of the magnetic tape. As the oscillator, an electrostrictor or a magnetostrictor is used.

That is, in the present invention, the principle of an ultrasonic motor which generates a surface wave (flexure vibration) by ultrasonic oscillation by the use of an electrostrictor or a magnetostrictor is applied. As for the ultrasonic motor, see, for instance, "Applied Physics", pp. 65–66, No. 6, Vol. 54, 1985, "Nikkei Mechanical", p. 40, No. 24, March, 1986, "Nikkei Electronics", pp. 90–92, No. 24, March, 1986, and "Nikkei Electronics", pp. 86–87, No. 9, March, 1987.

In accordance with the principle, numbers of wave peaks of the surface wave generated on the surface of the oscillator make ultrasonic oscillation while generating ellipsoidal loci and moves a movable member on the surface in the direction opposite to the traveling direction of the surface wave by friction. In the present invention, the magnetic tape is driven by bringing the oscillator having such a surface wave into surface-to-surface contact with the magnetic tape.

In the tape driving system of the present invention, the oscillator to be brought into contact with the magnetic tape may be caused to oscillate by transmitting vibration from a plurality of oscillating elements which are applied with high frequency voltages with phases different from each other by 90° or 120°, or may be directly formed of a plurality of contiguously arranged piezo-electric elements which are arranged so that traveling waves are generated on the surface of the piezo-electric elements when alternating voltages with different phases are applied to alternate piezo-electric elements.

In one preferred embodiment of the present invention, the transverse position of the magnetic tape is regulated by generating a unidirectional traveling-surface-wave by ultrasonic oscillation on a surface of an oscillator, and pressing the surface of the oscillator against a surface of the magnetic tape so that the traveling direction of the surface wave has a component directed in the transverse direction of the magnetic tape.

BRIEF DESCRIPTION OF THE DRAWINGS

FIGS. 8, 9 10 and 11A are schematic views for illustrating various embodiments of a system for regulating the transverse position of the magnetic tape, FIG. 11B is a side view of FIG. 11A, and FIG. 12 is a schematic view showing an example of the tape driving system which can employed in the systems shown in FIGS. 8 to 11A.

DESCRIPTION OF THE PREFERRED EMBODIMENT

Figure 1:
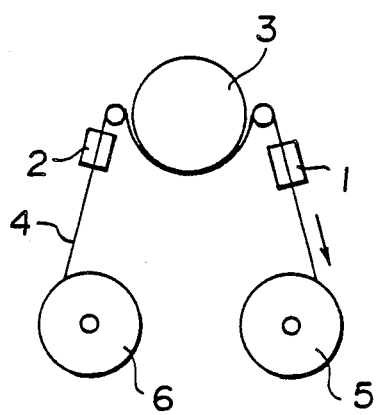
FIG. 1 is a schematic view showing a tape running system for a videotape recording and reproducing system provided with a tape driving system in accordance with the present invention.

In FIG. 1, a videotape 4 is unrolled from a supply reel 6 and taken up by a take-up reel 5. The videotape 4 is driven by first and second tape driving systems 1 and 2 in accordance with an embodiment of the present invention respectively disposed downstream and upstream of a rotary drum 3 having a magnetic head (not shown). The first tape driving system 1 downstream of the rotary drum 3 is for accurately running the magnetic tape 4 with respect to the rotary drum 3, and the second tape driving system 2 upstream of the rotary drum 3 is for applying back tension to the magnetic tape 4. As in the conventional videotape recording system, the take-up reel 5 is driven to take up the magnetic tape 4, while the supply reel 6 is arranged to apply light back tension to the magnetic tape 4.

Figure 2A:
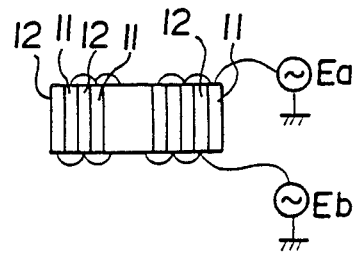
FIG. 2A is a schematic plan view showing a tape driving system in accordance with an embodiment of the present invention.
Figure 2B:
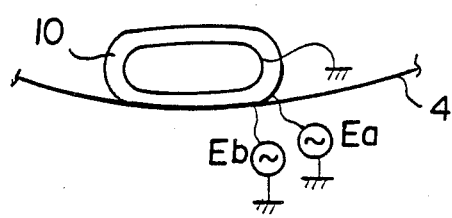
FIG. 2B is a side view of the tape driving system of FIG. 2A.

Each of the first and second tape driving systems 1 and 2 comprises, as shown in FIGS. 2A and 2B, a piezo-electric element row formed of a plurality of piezo-electric element pairs, each pair comprising first and second piezo-electric elements 11 and 12, arranged on a support 10 contiguously with each other. The piezo-electric element pairs are arranged so that the first and second piezo-electric elements 11 and 12 alternate with each other. The first and second piezo-electric elements 11 and 12 are respectively connected to first and second alternating electric sources Ea and Eb to be applied with alternating voltages with different phases. When the first and second piezo-electric elements 11 and 12 are applied with alternating voltages with different phases, traveling waves (surface waves) are generated on the surfaces of the piezo-electric element row and by pressing the magnetic tape 4 against the surface of the piezo-electric element row, the magnetic tape 4 is run in the direction opposite to the traveling direction of the surface waves as described above.

Figure 3:
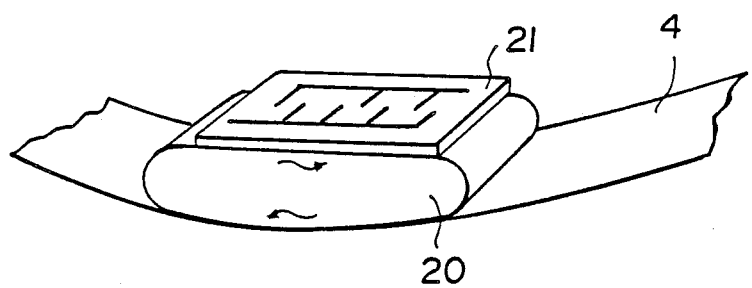
FIG. 3 is a schematic perspective view showing a tape driving system in accordance with another embodiment of the present invention.

FIG. 3 shows another embodiment of the present invention. The tape driving system of this embodiment comprises piezo-electric elements 21 fixed on one side of an elastic body 20. In this embodiment, by causing the elastic body 20 to make high frequency oscillation by the piezo-electric elements 21, thereby generating unidirectional traveling waves on the other side of the elastic body 20, and pressing the magnetic tape 4 against said the other side of the elastic body 20, the magnetic tape 4 is run.

Figure 4:
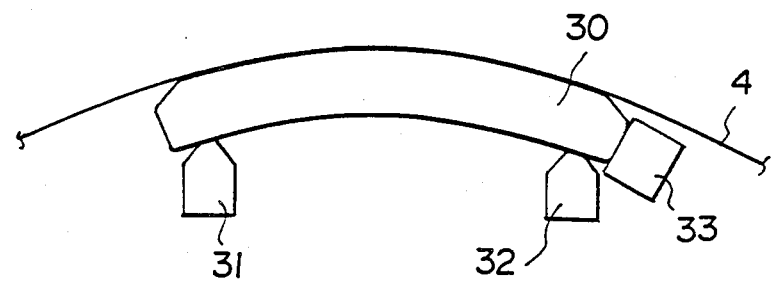
FIG. 4 is a schematic side view showing a tape driving system in accordance with still another embodiment of the present invention.

FIG. 4 shows still another embodiment of the present invention. The tape driving system of this embodiment comprises a pair of oscillators 31 and 32 in contact with an elastic body 30 at opposite ends of the elastic body 30. The oscillators 31 and 32 cause the elastic body 30 to make high frequency oscillations which differ from each other in phase by 90°. Further, a vibration absorber 33 is connected to one end of the elastic body 30 to prevent generation of reflected waves at one end of the elastic body 30 which can cause the oscillation of the elastic body 30 to act as stationary wave as a whole.

Figure 5:
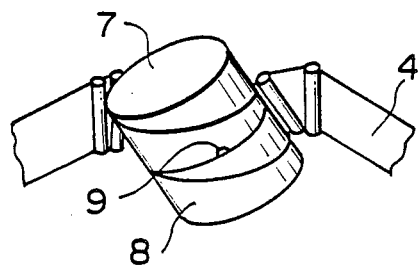
FIG. 5 is a schematic perspective view for illustrating a tape driving system in accordance with still another embodiment of the present invention.
Figure 6:
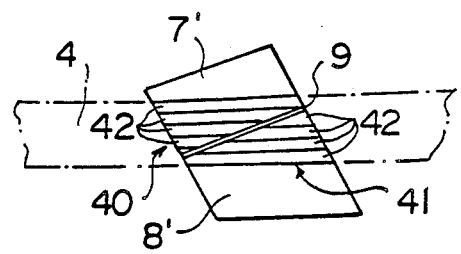
FIG. 6 is a schematic side view for illustrating a modification of the embodiment shown in FIG. 5.

In still another embodiment of the present invention shown in FIG. 5, the tape driving systems in accordance with the present invention are directly provided on a pair of cylinders 7 and 8 of the rotary drum of a videotape recording system. Between the cylinders 7 and 8 is provided a rotary magnetic head 9. The rotary magnetic head 9 is mounted on the cylinder 7 and the cylinder 8 is stationary. In this case, a piezo-electric element row like that described above is provided at least on a part of the surface of the stationary cylinder 8 along which the magnetic tape 4 is run. In the case that both the cylinders 7' and 8' are stationary with the rotary magnetic head 9 intervening therebetween as shown in FIG. 6, piezo-electric element groups 40 and 41 are provided on the cylinders 7' and 8', respectively. Each of the piezo-electric element groups 40 and 41 comprises a plurality of piezo-electric element rows 42 contiguously arranged in the direction perpendicular to the running direction of the magnetic tape 4. Each of the piezo-electric element rows 42 comprises a plurality of piezo-electric element pairs which are like those described above in conjunction with FIGS. 2A and 2B and arranged in the running direction of the magnetic tape 4 to generate surface waves in the longitudinal direction of the row, though the individual piezo-electric elements are not shown.

Figure 7:
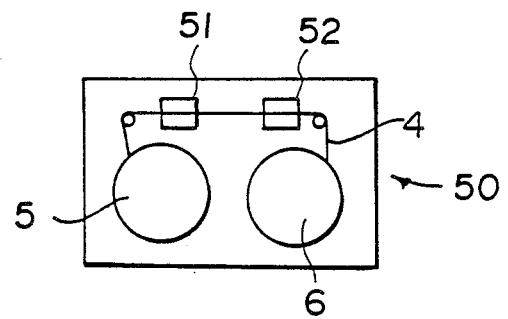
FIG. 7 is a schematic plan view showing an audiotape recording and reproducing system provided with a tape driving system in accordance with the present invention.

FIG. 7 shows still another embodiment in which the present invention is applied to an audiotape cassette 50. A pair of tape driving systems 51 and 52 are provided on opposite sides of the part at which the magnetic head of a tape recording and reproducing system is given access to the magnetic tape 4. The tape driving forces of the tape driving systems 51 and 52 differ from each other so that a desired back tension is applied to the tape 4 by virtue of the difference in the driving force.

In the case that the tape driving system of the present invention is applied to a videotape recording and reproducing system, the frequency of the oscillation of the tape driving system is preferably a multiple of a frequency corresponding to the number of horizontal scanning lines of a TV system. The term "multiple" should be interpreted to include "one-fold". That is, the frequency of the oscillation of the tape driving system may be equal to a frequency corresponding to the number of horizontal scanning lines of the TV system.

That is, an oscillator such as an electrostrictor or a magnetostrictor is generally oscillated at a resonance frequency which depends on the material of the element, the size of the element and the like. However, such a frequency can adversely affect the recording signal or the reproducing signal of the videotape recording and reproducing system to generate noise and/or flicker in a reproduced image. As will be apparent to those skilled in the art, when the frequency of the oscillation of the tape driving system is a multiple of a frequency corresponding to the number of horizontal scanning lines of the TV system used in the videotape recording and reproducing system, influence of the oscillation of the tape driving system on the image signals can be easily removed, and at the same time, the frequency of the driving power of the tape driving system can be easily obtained from the frequency used in the videotape recording and reproducing system.

For example, in the case of a NTSC TV system, the frequency of the oscillation of the tape driving system is preferred to be a multiple of 15.75 KHz, i.e., 262.5×2(fields)×30(frames).

The aforesaid principle can be applied in order to regulate position of the magnetic tape in the transverse direction. That is, conventionally, position of the magnetic tape is transversely regulated by a mechanical guiding member such as a flanged roller, a drum like pole or the like. However, as the thickness of the magnetic tape becomes smaller, it becomes more difficult to mechanically regulate position of the tape in the transverse direction by means of such a conventional guiding member.

That is, by generating a unidirectional traveling-surface-wave by ultrasonic oscillation on a surface of an oscillator, and pressing the surface of the oscillator against a surface of the magnetic tape so that the traveling direction of the surface wave has a component directed in the transverse direction of the magnetic tape, position of the magnetic tape can be regulated in the transverse direction.

For example, by providing a pair of oscillators so that the traveling directions of the surface waves generated on the surfaces of the respective oscillators have components which are directed in the transverse direction of the magnetic tape and are opposite to each other, and selectively driving one of the oscillators, transverse position of the magnetic tape can be regulated. Otherwise, transverse position of the magnetic tape may be regulated in one direction by an oscillator while the magnetic tape is normally urged in the other direction by other suitable means such as an inclined surface.

In FIG. 8, a tape guide 63 is provided with a pair of tape driving systems 62A and 62B so that the magnetic tape 4 is pressed against the tape driving systems 62A and 62B. The tape driving systems 62A and 62B may be like those described above in conjunction with FIGS. 2 to 4 or may be as shown in FIG. 12 which will be described later. The tape driving systems 62A 62B are respectively oriented to move the tape 4 obliquely upwardly and downwardly as shown by arrows B with respect to the running direction of the magnetic tape shown by arrow A. The tape driving systems 62A and 62B are selectively energized to move upward or downward the magnetic tape 4 under the control of an output signal of a tape position detecting means (not shown) which detects the transverse position of the magnetic tape 4.

The tape driving system 62A and 62B may be oriented to move the magnetic tape 4 upward and downward in perpendicular to the running direction of the magnetic tape 4 as shown in FIG. 9. Though, in the embodiment shown in FIG. 9, the tape driving system 62A is positioned on the upper portion of the tape guide 63 while the tape driving system 62B is positioned on the lower portion of the tape guide 63, the tape driving systems 62A and 62B may be alternately arranged as shown in FIG. 10.

In the embodiments shown in FIGS. 8 to 10, when both the driving systems 62A and 62B are simultaneously energized to exert the same driving forces, the magnetic tape 4 is not moved in the transverse direction thereof. On the other hand, when only one of the driving systems 62A and 62B is energized with the other being de-energized, or when both the driving systems 62A and 62B are simultaneously energized so that one of them exerts driving force stronger than the other, the magnetic tape 4 is moved in the direction in which the driving force of said one of the driving systems 62A and 62B acts.

In another embodiment shown in FIGS. 11A and 11B, a single tape driving system 65 is supported on an inclined surface of a tape guide 64 so that the magnetic tape 4 is urged in the direction shown by arrow C in FIG. 11A by virtue of the inclined surface of the tape guide 64. The tape driving system 65 is energized to exert a driving force in the direction shown by arrow D which is equally balanced with the urging force provided in the direction of the arrow C by the inclined surface of the tape guide 64. The driving force of the driving system 65 is adjusted under the control of an output signal of a tape position detecting means (not shown) which detects the transverse position of the magnetic tape 4.

The tape driving system shown in FIG. 12 comprises a plurality of electrostrictors 66A and 66B alternately arranged side by side. The electrostrictors 66A and 66B are connected to a single long electrode 68 at respective one ends and are respectively opposed to separate electrodes 67A and 67B at respective the other ends. The electrodes 67B. connected to an alternating electric source 69 and the electrodes 67A are connected to another alternating electric source 70. When the electrodes 67A and 67B are imparted with alternating voltages with difference phases, the electrostrictors 66A and 66B make longitudinal oscillations, thereby generating laterally (in the direction of the row of the electrostrictors) traveling-surface-wave as a whole.

As can be understood from the description above, in the tape driving system of the present invention, the magnetic tape is not subjected to strong local tension since the magnetic tape is run by way of surface-to-surface contact of the oscillator and the magnetic tape, accordingly, the magnetic tape cannot be stretched or twisted to adversely affect running of the tape even if the tape is very thin. Further, since the motor for driving the capstan required in the conventional tape driving can be eliminated and the position of the tape driving system can be freely selected, the overall tape driving system can be further reduced in size and weight.

Further, the tape driving system in accordance with the present invention is advantageous over the conventional tape driving systems in that the magnetic tape can be run with a high accuracy better than 1 μm and with an excellent response.

We claim:

1. A method of driving a magnetic tape comprising steps of generating a unidirectional traveling-surface-wave by ultrasonic oscillation on a surface of a first oscillator, and pressing the surface of the oscillator a surface of the magnetic tape, thereby running the tape in the direction opposite to the traveling d of said surface-wave.

2. A method as defined in claim 1 in which said first oscillator comprises a plurality of piezo-electric elements contiguously arranged in a row, and said traveling-surface-wave is generated by applying alternating voltages with different phases to the alternate piezoelectric elements.

3. A method as defined in claim 1 in which the frequency of said ultrasonic oscillation is a multiple of a frequency corresponding to the number of horizontal scanning lines of a TV system.

4. A method as defined in claim 1 or 3 further comprising steps of generating a unidirectional traveling-surface-wave by ultrasonic oscillation on a surface of a second oscillator, and pressing the surface of the second oscillator against a surface of the magnetic tape so that the traveling direction of the surface wave on the second oscillator has a component directed in the transverse direction of the magnetic tape, thereby regulating position of the magnetic tape in the transverse direction.

5. A method as defined in claim 1 further comprising the steps of generating a unidirectional traveling-surface-wave by ultrasonic oscillation on a surface of a second oscillator, and pressing the surface of the second oscillator against a surface of the magnetic tape so that the traveling direction of the surface wave on the second oscillator is in the same direction as the traveling direction of the surface wave on said first oscillator, said first oscillator for running the magnetic tape and said second oscillator for applying back tension to the magnetic tape.

6. A tape driving system for driving a magnetic tape in the longitudinal direction thereof comprising a first oscillator adapted to be pressed against the magnetic tape and an oscillating means for generating the surface of the first oscillator to be brought into contact with the magnetic tape a surface wave traveling in the longitudinal direction of the magnetic tape by ultrasonic oscillation.

7. A tape driving system as defined in claim 6 in which said oscillating means comprises a plurality of piezo-electric elements contiguously arranged in a row, and said surface wave is generated by applying alternating voltages with different phases to the alternate piezoelectric elements.

8. A tape driving system as defined in claim 7 in which the frequency of said ultrasonic oscillation is a multiple of a frequency corresponding to the number of horizontal scanning lines of a TV system.

9. A method as defined in claim 6 or 8 further comprising a second oscillating means for generating a unidirectional traveling-surface-wave by ultrasonic oscillation on a surface of a second oscillator which is pressed against a surface of the magnetic tape so that the traveling direction of the surface wave on the second oscillator has a component directed in the transverse direction of the magnetic tape, thereby regulating position of the magnetic tape in the transverse direction.

10. A tape driving system as defined in claim 6 further including a second oscillator, an elastic body, and means for causing said first and second oscillators to oscillate substantially 90° out of phase with respect to each other, said first oscillator and said second oscillator being in contact with the opposite ends of said elastic body.

11. A tape driving system as defined in claim 6 further comprising a rotary drum of a videotape recording apparatus said rotary drum including first and second cylinders, said first oscillator being provided at least on a surface of one of said cylinders along which a magnetic tape is run.

12. A tape driving system as defined in claim 6 wherein said magnetic tape is video tape.

13. A tape driving system as defined in claim 6 wherein said magnetic tape is audio tape.

14. A method of regulating the transverse position of a running magnetic tape comprising steps of generating a unidirectional traveling-surface-wave by ultrasonic oscillation on a surface of an oscillator, and pressing the surface of the oscillator against a surface of the magnetic tape so that the traveling direction of the surface wave on the oscillator has a component directed in the transverse direction of the magnetic tape.

15. A magnetic tape regulating system comprising a first oscillator which is adapted to be pressed against a surface of a magnetic tape running in a tape running system, and a first means for generating on the surface of the first oscillator to be brought into contact with the magnetic tape a surface wave traveling in a direction having a component directed in the transverse direction of the magnetic tape, thereby regulating position of the magnetic tape in the transverse direction.

16. A magnetic tape regulating system as claimed in claim 15 further including a second oscillator adapted to be pressed against a surface of said magnetic tape, and second means for generating on the surface of said second oscillator a surface wave traveling in the longitudinal direction of the magnetic tape.

17. A magnetic tape regulating systems including a tape guide to which is attached first and second oscillators of the type claimed in claim 15, and means for selectively energizing said first or said second oscillators to selectively move said magnetic tape upward or downward.

18. A magnetic tape regulating system as claimed in claim 17 wherein said first and second oscillators are positioned on said tape guide to selectively move said magnetic tape obliquely upwardly or downwardly.

19. A magnetic tape regulating system as claimed in claim 17, wherein said first and second oscillators are positioned on said tape guide to selectively move said magnetic tape upward or downward, perpendicular to the longitudinal direction of the tape.

20. A magnetic tape regulating system as claimed in claim 15 further included a tape guide with an inclined surface, said first oscillator being attached to the inclined surface of said tape guide.

21. A magnetic tape regulating system as claimed in claim 15 wherein said first oscillator comprises a plurality of electrostrictors arranged side by side, a long electrode connected to one end of each of said electrostrictors, a first plurality of short electrodes connected to alternate ones of said electrostrictors at an opposite end thereof, and a second plurality of short electrodes connected to the remaining alternate one of electrostrictors at an opposite end thereof.

* * * * *